United States Patent [19]

Travers et al.

[11] Patent Number: 5,607,891

[45] Date of Patent: Mar. 4, 1997

[54] PROCESS FOR REDUCING THE BENZINE CONTENT OF PETROLS

[75] Inventors: Christine Travers, Rueil Malmaison; Philippe Courty, Houilles; Patrick Sarrazin, Rueil Malmaison, all of France

[73] Assignee: Institut Francais du Petrole, France

[21] Appl. No.: 638,313

[22] Filed: Apr. 26, 1996

Related U.S. Application Data

[63] Continuation of Ser. No. 365,930, Dec. 29, 1994, abandoned.

[30] Foreign Application Priority Data

Dec. 29, 1993 [FR] France .................................. 93 15.953

[51] Int. Cl.$^6$ .......................... B01J 27/06; B01J 27/128; B01J 27/13
[52] U.S. Cl. .......................... 502/229; 502/224; 502/230
[58] Field of Search ..................................... 502/224, 229, 502/230

[56] References Cited

U.S. PATENT DOCUMENTS

| | | | |
|---|---|---|---|
| 3,025,248 | 3/1962 | Oleck et al. | |
| 3,173,856 | 3/1965 | Burton et al. | 208/138 |
| 3,717,586 | 2/1973 | Suggitt et al. | 502/220 |
| 3,871,996 | 3/1975 | Sinfelt | 208/139 |
| 3,903,192 | 9/1975 | Torck et al. | |
| 3,925,196 | 12/1975 | Sinfelt et al. | 208/139 |
| 5,017,541 | 5/1991 | Schmidt et al. | 502/169 |
| 5,401,705 | 3/1995 | Amelse | 502/174 |

FOREIGN PATENT DOCUMENTS

| | | |
|---|---|---|
| 1220868 | 5/1960 | France . |
| 0552069 | 7/1993 | France . |
| WO92/20759 | 11/1992 | WIPO . |

*Primary Examiner*—Anthony Mc Farlane
*Assistant Examiner*—E. D. Irzinski
*Attorney, Agent, or Firm*—Millen, White, Zelano, & Branigan, P.C.

[57] ABSTRACT

The invention concerns an isomerization catalyst comprising 4 to 15% of at least one halogen and at least one metal from group VIII deposited on a support composed of a mixture of specific proportions of eta alumina and gamma alumina. The invention also concerns a process for reducing the benzene content of gasoline fractions and isomerizing paraffins in the presence of this catalyst, in which isomerization is carried out on a mixture of a) a feed with the following composition by weight: 40% to 80% of paraffins, 0.5% to 7% of cyclic hydrocarbons and 6% to 45% of aromatics, and with a maximum distillation temperature of between 70° C. and 90° C., and b) a $C_5$–$C_6$ cut which is generally a straight run cut.

20 Claims, No Drawings

PROCESS FOR REDUCING THE BENZINE CONTENT OF PETROLS

This application is a continuation of application Ser. No. 08/365,930, filed Dec. 29, 1994 and now abandoned.

BACKGROUND OF THE INVENTION

This invention concerns an isomerization catalyst comprising 4 to 15% of at least one halogen and at least one metal from group VIII deposited on a support composed of a mixture of specific proportions of eta alumina and gamma alumina. The invention also concerns a process for reducing the benzene content of gasoline fractions and isomerizing paraffins in the presence of this catalyst, in which a feed such as a light reformate and/or a $C_5$–$C_6$ cut is isomerizing.

Environmental problems have led to a joint reduction in the lead content and the benzene content in the gasoline pool, preferably without reducing the octane number. Catalytic reforming under very severe conditions and isomerization of normal $C_5$–$C_6$ paraffins with a low octane number are currently the most frequently used processes for producing high octane numbers without adding lead. However, catalytic reforming produces large quantities of benzene with a high octane number. Thus it is necessary to develop new processes which can reduce the benzene content in a gasoline while complying with octane number specifications.

The combination of catalytic reforming and isomerization, consisting in separating the $C_5$–$C_6$ fraction from the reformate, isomerizing it and introducing it directly into gasoline fractions to improve the octane number, are well known: this is, for example, described in U.S. Pat. Nos. 4,457,832, 4,181,599 and 3,761,392. Isomerization of the $C_5$–$C_6$ cut from a straight run crude is also well known. The octane number of the cut is considerably improved. The benzene content of the reformate can be reduced in different ways, such as modifying the naphtha cut point between reforming and isomerization or separating the reformate into two fractions: a heavy fraction (heavy reformate) and a light fraction (light reformate), all the benzene being concentrated in said light fraction. The light fraction is then sent to a hydrogenation unit which transforms the benzene into naphthenes which are then ring opened in an isomerization unit operating under severe conditions. The normal paraffins formed are then isomerized using a conventional isomerization process U.S. Pat. No. 5,003,118). In addition, European patent application EP-A-0 552 070 concerns a process for reducing the benzene content of a gasoline fraction comprising hydrogenation of a feed of the following composition by weight: 40% to 80% of paraffins, 0.5% to 7% of cyclic hydrocarbons and 6% to 45% of aromatics, and with a maximum distillation temperature of between 70° C. and 90° C. The hydrogenation effluent is then isomerized, mixing said charge and/or said effluent with a $C_5$–$C_6$ cut.

European patent application EP-A-0 552 069 further concerns a process for the isomerization of a feed such as a light reformate and/or a $C_5$–$C_6$ cut in the presence of an isomerisation carrier which preferably comprises at least one group VIII metal and a mordenite with a Si/Al ratio of between 5 and 50.

U.S. Pat. No. 3,025,248 describes a process for the production of a catalyst with an alpha and beta alumina based support which is treated to convert the aluminas into eta and gamma aluminas. The catalyst also contains a small quantity of platinum or another metal such as palladium, nickel, iron or cobalt, and optionally a trace of chlorine.

SUMMARY OF THE INVENTION

The present invention concerns a catalyst particularly for use in a process for reducing the benzene content of gasoline fractions.

The support for such a catalyst is constituted by eta alumina and gamma alumina, the eta alumina content in the support being between 85% and 95% by weight, preferably between 88% and 92% by weight, more preferably between 85% and 91% by weight, the complement to 100% of the support being constituted by gamma alumina, said catalyst also comprising 4% to 15%, preferably 6% to 15%, more preferably 6% to 11%, of at least one halogen, preferably chlorine, and at least one group VIII metal.

The eta alumina used in the present invention generally has a specific surface area of between 400 and 600 $m^2/g$, preferably between 420 and 550 $m^2/g$, and a total pore volume which is generally between 0.3 and 0.5 $cm^3/g$, preferably between 0.35 and 0.45 $cm^3/g$.

The gamma alumina used in the present invention generally has a specific surface are of between 150 and 300 $m^2/g$, preferably between 180 and 250 $m^2/g$, and a total pore volume which is generally between 0.4 and 0.8 $cm^3/g$, preferably between 0.45 and 0.7 $cm^3/g$.

The two types of alumina are mixed and formed in the proportions defined above, using any technique which is known to the skilled person, for example extrusion through a die, pelletizing or coating.

The support obtained generally has a specific surface area of between 300 and 550 $m^2/g$, preferably between 350 and 500 $m^2/g$, and a pore volume generally between 0.3 and 0.6 $cm^3/g$, preferably between 0.35 and 0.5 $cm^3/g$.

At least one hydrogenating metal from group VIII, preferably selected from the group formed by platinum, palladium and nickel, is then deposited on the support using any technique which is known to the skilled person, for example anion exchange using hexachloroplatinic acid in the case of platinum, or palladium chloride in the case of palladium.

When platinum or palladium is used, the concentration is between 0.05% and 1% by weight, preferably between 0.1% and 0.6% by weight. When nickel is used, the concentration is between 0.1% and 10% by weight, preferably between 0.2% and 5% by weight.

The catalyst thus prepared can be reduced in hydrogen, then halogenated using any halogen compound which is known to the skilled person. In the case of chlorine, the halogenated compound can be carbon tetrachloride or perchloroethylene. The halogen content, preferably chlorine, in the finished catalyst is between 4% and 15% by weight, preferably between 6% and 15% by weight, more preferably between 6% and 11%.

This halogenation treatment can either be carried out directly in the unit before injection of the feed, or offsite. Halogenation can also be carried out prior to reducing the catalyst in hydrogen.

The present invention also concerns the use of this catalyst in a process particularly for reducing the benzene content in gasoline fractions, in which a feed such as a light reformate fraction and/or a $C_5$–$C_6$ cut, generally a straight run cut, is isomerized. Surprisingly, an effluent is obtained which is practically free of benzene (i.e., contains less than 0.1% of benzene) and has a research octane number which is greater than or equal to the research octane number of the light reformate, and which can then be directly incorporated into gasoline fractions following stabilization.

The light reformate fraction is obtained by distilling the reformate. It is defined by a maximum distillation temperature of between 70° C. and 90° C., preferably between 77° C. and 83° C., and the following composition by weight: 40.0% to 80.0% of paraffins, 0.5% to 7.0% of cyclic hydrocarbons (such as methylcyclopentane, cyclopentane and cyclohexane), and 6.0% to 45.0% of aromatics. The distillation temperature is generally between room temperature and the maximum distillation temperature (or overhead temperature).

The aromatic hydrocarbons are generally substantially constituted by benzene. In addition, between 1.0% and 3.0% of olefinic hydrocarbons can be present in the light fraction. In general, the light fraction has the following properties: an average molecular weight of between 70 and 90 g/mole, a density of between 0.670 and 0.780 g/cm$^3$ at 15° C. and a research octane number of between 75 and 90.

Any other hydrocarbon feed which has the following composition by weight can be used: 40% to 80% of paraffins, 0.5% to 7% of cyclic hydrocarbons and 6% to 45% of aromatics, and by a maximum distillation temperature of between 70° C. and 90° C., preferably 77° C. to 83° C.

The composition by weight of the $C_5$–$C_6$ cut, normally a straight run cut, depends on the nature of the untreated crude.

Nevertheless, the cut can be generally defined by a paraffin content which is generally greater than 90% by weight, a cyclic hydrocarbon content which is generally less than 10% by weight and a benzene content which is generally less than 1.5% by weight. The research octane number is generally between 60 and 75.

The cut may also contain very small quantities of compounds containing 4 carbon atoms per molecule (less than 0.5% by weight).

In accordance with the present invention, the two feeds described above are mixed, then sent to the isomerization unit. The $C_5$–$C_6$ cut content in the mixture can be varied from 10% to 90%, preferably from 15% to 55%.

A chlorine-containing compound, such as carbon tetrachloride or perchloroethylene, is added to the above mixture before it enters the isomerization zone, such that the chlorine content in the feed is between 50 and 5000 ppm, preferably between 100 and 1000 ppm.

The isomerization zone is operated under normal isomerization conditions. It is contained in at least one reactor.

The temperature is between 100° C. and 300° C., preferably between 120° C. and 250° C., and the partial pressure of hydrogen is between atmospheric pressure and 70 bars, preferably between 5 and 50 bar. The space velocity is between 0.2 and 10 liters, preferably between 0.5 and 5 liters of liquid hydrocarbon per liter of catalyst per hour. The hydrogen/hydrocarbon molar ratio at the reactor inlet is such that the hydrogen/hydrocarbon molar ratio in the effluent is greater than 0.06, preferably between 0.06 and 10.

The stabilized effluent obtained thus has an octane number which is sufficiently high for it to be incorporated into the gasoline pool after stabilization and is practically completely free of benzene (less than 0.1% by weight in the effluent).

The following examples illustrate the invention without limiting its scope.

EXAMPLE 1 (in accordance with the invention)

A light reformate obtained after distillation at 80° C., containing 21.5% of benzene and with an octane number of 80.3, was mixed in a proportion of 50% by weight with a $C_5$–$C_6$ straight run cut containing 0.7% of benzene and with an octane number of 65. The compositions of the two products are shown in Table 1. The light reformate contained 21.5% of aromatics, 4% of cyclic hydrocarbons and 74.5% of paraffins. The $C_5$–$C_6$ cut contained 0.7% of benzene, 7.25% of cyclic hydrocarbons and 92.05% of paraffins. The mixture of the two feeds, with the composition shown in Table 1, was sent to an isomerization unit at a temperature of 170° C. and at a pressure of 30 bar. The space velocity was 2 liters of liquid hydrocarbon per liter of catalyst per hour and the hydrogen/hydrocarbon molar ratio of the feed was such that the same ratio in the effluent was 0.07.

The catalyst used was composed of 0.3% by weight of Pt deposited on a support constituted by 90% by weight of eta alumina and 10% by weight of gamma alumina. This catalyst was then chlorinated to 9% by weight of Cl. The effluent from the isomerization unit had the composition given in Table 1. It was practically free of benzene and had an octane number of 81.5. It could then be incorporated directly into gasoline fractions after stabilization.

TABLE 1

|  | Reformate | $C_5$–$C_6$ distillation cut | isomerization inlet feed | isomerization outlet effluent |
|---|---|---|---|---|
| Lights | 6.5 | 1.0 | 3.7 | 6.0 |
| $iC_5$ | 9.9 | 18.9 | 14.4 | 23.7 |
| $nC_5$ | 7.1 | 25.4 | 16.25 | 7.4 |
| $22DMC_4$ | 3.0 | 0.4 | 1.7 | 13.2 |
| $23DMC_4$ | 4.1 | 1.85 | 3.0 | 4.9 |
| $2MC_5$ | 15.8 | 11.1 | 13.45 | 16.5 |
| $3MC_5$ | 12.5 | 9.4 | 11.0 | 10.1 |
| $nC_6$ | 12.1 | 19.6 | 15.9 | 6.7 |
| $C_7$ | 3.5 | 4.4 | 3.9 | 3.0 |
| $CC_5$ | 0.4 | 1.4 | 0.9 | 0.5 |
| $MCC_5$ | 3.6 | 4.1 | 3.85 | 4.9 |
| $CC_6$ | 0 | 1.75 | 0.85 | 3.1 |
| Benzene | 21.5 | 0.7 | 11.1 | — |
| RON | 80.3 | 65 | 72.9 | 81.5 |

EXAMPLE 2 (in accordance with the invention)

Six catalysts were prepared with references A to F, composed of 0.3% of Pt deposited on a support comprising a mixture of eta alumina and gamma alumina, the eta alumina content of the support being varied from 85% to 95% as shown in Table 2. The catalysts thus defined were chlorinated to 9% by weight of chlorine. The inlet feed for the isomerization unit, with the composition shown in Table 1, was sent to an isomerization unit operating under the conditions described for Example 1. The RON obtained after isomerization are shown in Table 2. It can be seen that the maximum RON was obtained when the eta alumina content in the support was between 89% and 91%.

TABLE 2

|  | A | B | C | D | E | F |
|---|---|---|---|---|---|---|
| η $Al_2O_3$ content in support (%) | 85 | 88 | 89 | 91 | 92 | 95 |
| RON after isomerization | 81 | 81.2 | 81.5 | 81.5 | 81.2 | 81 |

EXAMPLE 3 (in accordance with the invention)

The present Example differed from Example 1 only in that the chlorine content of the catalyst used in the isomerization unit was 7% by weight.

The effluent from the isomerization unit had the composition given in Table 3. It no longer contained benzene and had an octane number of 80.3. It could thus be directly incorporated into gasoline fractions after stabilization.

TABLE 3

|  | Reformate | $C_5$-$C_6$ distillation cut | isomerization inlet feed | isomerization outlet effluent |
|---|---|---|---|---|
| Lights | 6.5 | 1.0 | 3.7 | 6.0 |
| iC$_5$ | 9.9 | 18.9 | 14.4 | 22.2 |
| nC$_5$ | 7.1 | 25.4 | 16.25 | 8.9 |
| 22DMC$_4$ | 3.0 | 0.4 | 1.7 | 12.7 |
| 23DMC$_4$ | 4.1 | 1.85 | 3.0 | 4.5 |
| 2MC$_5$ | 15.8 | 11.1 | 13.45 | 16.5 |
| 3MC$_5$ | 12.5 | 9.4 | 11.0 | 10.1 |
| nC$_6$ | 12.1 | 19.6 | 15.9 | 7.6 |
| C$_7$ | 3.5 | 4.4 | 3.9 | 3.0 |
| CC$_5$ | 0.4 | 1.4 | 0.9 | 0.5 |
| MCC$_5$ | 3.6 | 4.1 | 3.85 | 4.9 |
| CC$_6$ | 0 | 1.75 | 0.85 | 3.1 |
| Benzene | 21.5 | 0.7 | 11.1 | — |
| RON | 80.3 | 65 | 72.9 | 80.3 |

EXAMPLE 4 (comparative)

Example 4 differed from Example 3 only in that the catalyst used in the isomerization zone was composed of 0.3% by weight of Pt deposited on a support constituted by 50% by weight of eta alumina and 50% by weight of gamma alumina. The catalyst thus defined was then chlorinated. The finished chlorine content was 7% by weight.

Table 4 gives the composition of the effluent leaving the isomerization unit.

TABLE 5

|  | Refromate | $C_5$-$C_6$ distillation cut | isomerization inlet feed | isomerization outlet effluent |
|---|---|---|---|---|
| Lights | 6.5 | 1.0 | 3.7 | 65.5 |
| iC$_5$ | 9.9 | 18.9 | 14.4 | 18.4 |
| nC$_5$ | 7.1 | 25.4 | 16.25 | 12.3 |
| 22DMC$_4$ | 3.0 | 00.4 | 1.7 | 10.3 |
| 23DMC$_4$ | 4.1 | 1:85 | 3.0 | 3.9 |
| 2MC$_5$ | 15.8 | 11.1 | 13.45 | 12.9 |
| 3MC$_5$ | 12.5 | 9.4 | 11.0 | 7.9 |
| nC$_6$ | 12.1 | 19.6 | 15.9 | 15.0 |
| C$_7$ | 3.5 | 4.4 | 3.9 | 3 |
| CC$_5$ | 0.4 | 1.4 | 0.9 | 0.5 |
| MCC$_5$ | 3.6 | 4.1 | 3.85 | 5.2 |
| CC$_6$ | 0 | 1.75 | 0.85 | 5.1 |
| Benzene | 21.5 | 0.7 | 11.1 | — |
| RON | 80.3 | 65 | 72.9 | 74.8 |

The gain in octane number (RON) between the isomerization unit feed and its effluent was very small. The octane number (RON) fell with respect to the light reformate.

Note: in the Tables above:
22DMC$_4$=2,2-dimethylbutane
23DMC$_4$=2,3-dimethylbutane
2MC$_5$=2-methylpentane
3MC$_5$=3-methylpentane
CC$_5$=cyclopentane
MCC$_5$=methyl cyclopentane
CC$_6$=cyclohexane

We claim:

1. A catalyst consisting essentially of, by weight, based on the finished catalyst 4% to 15% of chlorine and a catalytically effective amount of at least one group VIII metal on a support, said support consisting essentially of eta alumina and gamma alumina, the eta alumina content being between 85% and 95% by weight with respect to the support, the complement to 100% of the support being gamma alumina.

2. A catalyst according to claim 1, wherein said eta alumina content in the catalyst support is between 88% and 92% by weight.

3. A catalyst according to claim 1 wherein the group VIII metal is platinum, palladium or nickel.

4. A catalyst according to claim 1 wherein the eta alumina has a specific surface area of between 400 and 600 m$^2$/g and a pore volume of between 0.3 and 0.5 cm$^3$/g.

5. A catalyst according to claim 1 wherein the gamma alumina has a specific surface area of between 150 and 300 m$^2$/g and a pore volume of between 0.4 and 0.8 cm$^3$/g.

6. A catalyst according to claim 1, wherein the halogen is chlorine.

7. A catalyst according to claim 3, wherein the eta alumina has a specific surface area of between 400 and 600 m$^2$/g and a pore volume of between 0.3 and 0.5 cm$^3$/g.

8. A catalyst according to claim 7, wherein the gamma alumina has a specific surface area of between 150 and 300 m$^2$/g and a pore volume of between 0.4 and 0.8 cm$^3$/g.

9. A catalyst according to claim 8, wherein said eta alumina content in the catalyst support is between 88% and 92% by weight.

10. A catalyst according to claim 8, wherein said eta alumina content in the catalyst support is between 85 and 91% by weight.

11. A catalyst according to claim 8, wherein the eta alumina has a specific surface area of between 420 and 550 m$^2$/g and a pore volume of between 0.35 and 0.45 cm$^3$/g.

12. A catalyst according to claim 11, wherein the gamma alumina has a specific surface area of between 180 and 250 m$^2$/g and a pore volume of between 0.45 and 0.7 cm$^3$/g.

13. A catalyst according to claim 1, wherein the group VIII metal is platinum or palladium in a concentration of 0.05–1% by weight.

14. A catalyst according to claim 1, wherein the group VIII metal is platinum or palladium in a concentration of 0.1–0.6% by weight.

15. A catalyst according to claim 1, wherein the group VIII metal is nickel in a concentration of 0.1–10% by weight.

16. A catalyst according to claim 1, wherein the group VIII metal is nickel in a concentration of 0.2–5% by weight.

17. A catalyst according to claim 1, prepared by a process comprising reducing a group VIII metal compound deposited on an alumina support with a reducing gas consisting essentially of hydrogen.

18. A process according to claim 17, further comprising halogenating said catalyst either before or after said reduction.

19. A catalyst consisting of, by weight, based on the finished catalyst 4% to 15% of chlorine and a catalytic quantity of at least one group VIII metal on a support, said support consisting essentially of eta alumina and gamma alumina, the eta alumina content being between 85% and 95% by weight with respect to the support, the complement to 100% of the support being gamma alumina.

20. A catalyst consisting essentially of, by weight, based on the finished catalyst 4% to 15% of chlorine and at least one group VIII metal on a support, said support consisting essentially of eta alumina and gamma alumina, the eta alumina content being between 85% and 95% by weight with respect to the support, the complement to 100% of the support being gamma alumina.

* * * * *